3,395,045
METHOD FOR OPERATING HYDROGEN-OXYGEN FUEL CELLS
Paul Ruetschi, Yardley, Pa., assignor to ESB Incorporated, Philadelphia, Pa., a corporation of Delaware
No Drawing. Filed June 5, 1964, Ser. No. 373,084
4 Claims. (Cl. 136—86)

ABSTRACT OF THE DISCLOSURE

A method for operating a hydrogen-oxygen fuel cell which achieves a substantial improvement in fuel cell performance by periodic reactivation. The reactivation procedure comprises cutting off the hydrogen gas supply to the hydrogen electrode while continuing to supply oxygen to the oxygen electrode. The residual hydrogen is removed from the hydrogen electrode by either short-circuiting the hydrogen electrode to the oxygen electrode through an external resistor or by causing the oxygen electrode to evolve oxygen which has access to the electrolyte and which reacts with the hydrogen gas to remove it from the hydrogen electrode.

---

This invention relates to a method for operating fuel cells. In particular, the invention relates to a method for operating a hydrogen-oxygen fuel cell whereby a substantial improvement in fuel cell performance is achieved.

It is well known in the fuel cell art that during the long-term operation of hydrogen-oxygen fuel cells, the hydrogen or fuel electrode slowly, but steadily, loses electrochemical activity upon prolonged operation. This phenomenon has been observed in fuel cells employing an alkaline electrolyte and also in acidic fuel cells. Several methods of electrode preparation have been attempted in an effort to overcome this loss in hydrogen electrode activity, but unfortunately, they have not been successful.

It is an object of this invention to provide a method for operating a hydrogen-oxygen fuel cell which achieves a substantial improvement in fuel cell performance.

Another object of the invention is to provide an easy method for improving the performance of a hydrogen-oxygen fuel cell.

Other objects and purposes of this invention will be apparent to those skilled in the art in view of the following description.

It has been discovered that the performance of a hydrogen-oxygen fuel cell can be substantially improved by periodically reactivating the fuel cell. The reactivation procedures comprises cutting off the hydrogen gas supply to the hydrogen electrode while continuing to supply oxygen to the oxygen electrode. In addition, the residual hydrogen gas in the hydrogen electrode must be removed to permit the potential of the hydrogen electrode to increase and finally approach the potential of the oxygen electrode.

The hydrogen gas remaining in the hydrogen electrode after the hydrogen supply has been terminated may be removed by short circuiting the hydrogen electrode to the oxygen electrode through an external resistor. In this short-circuiting procedure, the fuel cell continues its normal operation until all of the residual hydrogen in the hydrogen electrode has been consumed. The reactions which occur within the fuel cell may be written as follows:

At the Hydrogen Electrode
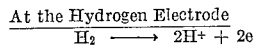

At the Oxygen Electrode
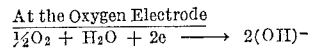

To complete the reaction, the hydrogen ions and the hydroxyl ions react to form water.

In some instances, it is not necessary to short-circuit the hydrogen electrode to the oxygen electrode through an external resistor. If the oxygen supply pressure is sufficient to cause oxygen to be evolved at the oxygen electrode into the electrolyte, which oxygen has access to the hydrogen electrode through the electrolyte, the fuel cell can be reactivated in an open-circuit position with no external short-circuiting. In fact, the short-circuit is effected in the electrolyte by the passage of oxygen through the electrolyte to the hydrogen electrode. In this case, the hydrogen gas reacts with the oxygen and the reaction is catalyzed by the hydrogen electrode catalyst. The reaction may be written as follows:

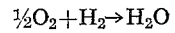

Both of these techniques for removing hydrogen from the hydrogen electrode are within the scope of this invention. When the term "short-circuiting" is used in this description and the claims which follow, it is intended to include both techniques, i.e. external short-circuiting and short-circuiting through the electrolyte, unless otherwise indicated.

It is generally preferred to use the external short-circuiting technique because the reactivation is usually more rapid and more complete, though the other technique is easier to carry out. The resistor used to effect the external short-circuit should be such that the hydrogen electrode is initially discharged at a rate of about 10 to about 500 ampere-hours per square foot of hydrogen electrode surface, which discharge is continued so long as there is hydrogen available in the hydrogen electrode.

The duration of the reactivation is not critical, but it should be continued until substantially all of the hydrogen has been removed from the hydrogen electrode and its potential has come up to that of the oxygen electrode. In general, the reactivation can be substantially completed in periods ranging from about ½ hour to about 24 hours, but this is a matter of operator's choice.

When the reactivation has been completed and hydrogen is again supplied to the hydrogen electrode, the hydrogen electrode will rapidly return to its proper open circuit potential. Subsequent operation of the fuel cell demonstrates that it has been reactivated and is capable of delivering a substantially greater current. In many instances, all of the loss in fuel cell electrochemical activity suffered during long operation of the fuel cell is recoverable by this technique.

The reactivation technique is applicable to both acid and alkaline type fuel cells. It has been found to be particularly effective in acid fuel cells, for it has been determined that hydrogen electrodes in an acid system are most effectively reactivated at a potential of from about 0.9 to 1.2 volts and the oxygen electrode is capable of delivering about 1 volt. However, in alkaline systems it appears that the most effective potentials for reactivating hydrogen electrodes are in the range of about 1.6 volts to about 1.8 volts which exceeds the approximately 1 volt potential of the oxygen electrode. Therefore, in alkaline fuel cells, the reactivation method of this invention may not be the most effective and may require more frequent reactivations and reactivations of a relatively long duration.

The method of operating fuel cells in accordance with this invention has several applications. For example, in the operation of a fuel cell powered vehicle, after many hours of operation, the fuel cell is switched to a standby or reactivation position by turning off the hydrogen flow and by electrically connecting the hydrogen electrode to the oxygen electrode through a resistive short-circuit path. Both of these operations, i.e. the stopping of the hydrogen flow and the short-circuiting, could be performed with one combined turn-off switch. Upon restarting the fuel cell, the hydrogen supply is turned on and the short-circuit is broken simultaneously. With this mode of operation, it is possible to operate fuel cells for long periods of time without substantial loss of catalytic activity in the hydrogen electrodes.

In a system which requires a continuous output of electric current, a plurality of fuel cells might be provided and electrically connected so that one cell can be reactivated while the others are in operation. A timing device could successively switch cells into the stand-by activation position. In this manner, a certain number of fuel cells will always be available for supplying electrical power while others are being reactivated.

The following example illustrates the reactivation technique and a method for operating a fuel cell in accordance with this invention.

Example I

An acid fuel cell having 6 oxygen electrodes and 6 hydrogen electrodes was assembled and operated. The electrodes were prepared from porous polyethylene tubes having 55% porosity. The hollow electrode tubes had a ¼ inch inside diameter, a wall thickness of 0.015 inch and were 15.3 cm. long. The electrode tubes were plated with 1.2 mg. (milligrams) of palladium and 14.3 mg. of platinum per cm.$^2$. The tubes were packed with carbon-black powder having a 5% by weight platinum coating. A central electrical contact wire of 0.03 inch diameter tantalum extended through the platinum coated carbon-black for the entire length of each tube. Outer electrical contact was made by a 0.012 inch diameter tantalum wire which was wound spirally around each electrode with 15 threads per inch in double strand. The total surface area was 120 cm.$^2$ for both the oxygen and hydrogen electrodes which were substantially identical.

The fuel cell container had a total volume of 650 cm.$^3$. The electrodes were arranged in 3 rows of 4 alternating hydrogen-oxygen electrodes and were spaced such that there was 0.375 inch center to center of each electrode tube. The electrolyte was 4 molar sulfuric acid, and the fuel cell was operated at about 25° C. (room temperature). The oxygen and hydrogen were fed to their respective electrodes at a pressure of 6 p.s.i.

The fuel cell was operated for several days and on two occasions it was reactivated in accordance with this invention. During the reactivation, the hydrogen gas was disconnected while oxygen continued to feed to the oxygen electrode at the operating pressure of 6 p.s.i. Since the oxygen electrode was vigorously evolving oxygen, the easier open-circuit method of reactivation, i.e. no external short-circuit, was used.

The following data was obtained:

| Day | Time | Current (ma.) | Current Density (ma./cm.$^2$) | Voltage (volts) | Power (watts) |
|---|---|---|---|---|---|
| 1 | 1600 | 900 | 7.5 | 0.220 | 0.198 |
| 2 | 1630 | 900 | 7.5 | 0.220 | 0.198 |
| 3 | 1600 | 900 | 7.5 | 0.220 | 0.198 |
| 4 | 1530 | 900 | 7.5 | 0.220 | 0.198 |

At this time, the fuel cell was reactivated for 1 hour and the performance improved

| | | | | | |
|---|---|---|---|---|---|
| 4 | 1630 | 925 | 7.7 | 0.225 | 0.208 |

At this time, the fuel cell was reactivated for 24 hours and the performance improved substantially

| | | | | | |
|---|---|---|---|---|---|
| 5 | 1630 | 1200 | 10.0 | 0.300 | 0.360 |
| 8 | 1630 | 1150 | 9.6 | 0.280 | 0.323 |
| 10 | 1630 | 1000 | 8.3 | 0.350 | 0.350 |
| 12 | 1630 | 960 | 8.0 | 0.300 | 0.288 |

This data clearly illustrates the substantial improvement in fuel cell performance achieved by operating a fuel cell in accordance with this invention.

Having completely described this invention, what is claimed is:

1. A method for operating hydrogen-oxygen fuel cells having hydrogen electrodes and oxygen electrodes immersed in electrolyte which comprises cutting off the hydrogen gas supply to the hydrogen electrode while continuing to supply oxygen to the oxygen electrode, removing the residual hydrogen gas from the hydrogen electrode by short-circuiting the hydrogen electrode to the oxygen electrode through an external resistor, whereby the potential of the hydrogen electrode approaches the potential of the oxygen electrode, and thereafter, normally operating the fuel cell by supplying hydrogen to the hydrogen electrode and oxygen to the oxygen electrode.

2. A method in accordance with claim 1 in which the fuel cell has an acid electrolyte.

3. A method for operating hydrogen-oxygen fuel cells having hydrogen electrodes and oxygen electrodes immersed in electrolyte which comprises placing the fuel cell on open circuit, cutting off the hydrogen gas supply to the hydrogen electrode while continuing to supply oxygen to the oxygen electrode, causing the oxygen electrode to evolve oxygen which has access to the residual hydrogen gas in the hydrogen electrode through the electrolyte and which reacts with said residual hydrogen gas to remove it from the hydrogen electrode, thereby short-circuiting the hydrogen electrode to the oxygen electrode through the electrolyte, whereby the potential of the hydrogen electrode approaches the potential of the oxygen electrode, and thereafter, normally operating the fuel cell by supplying hydrogen to the hydrogen electrode and oxygen to the oxygen electrode.

4. A method in accordance with claim 3 in which the fuel cell has an acid electrolyte.

References Cited

UNITED STATES PATENTS

| 2,946,836 | 7/1960 | Justi et al. | 136—86 |
| 2,947,797 | 8/1960 | Justi et al. | 136—86 |
| 3,080,440 | 3/1963 | Reutschi et al. | 136—86 X |

FOREIGN PATENTS

| 17,651 | 1/1930 | Australia. |

OTHER REFERENCES

ASTIA in Ad. 248,480 January 1961 (only pages 17, 18 and 21 relied upon).

ALLEN B. CURTIS, *Primary Examiner.*